US006974183B2

(12) United States Patent
Bergmiller et al.

(10) Patent No.: US 6,974,183 B2
(45) Date of Patent: Dec. 13, 2005

(54) OPENABLE MOTOR VEHICLE ROOF

(75) Inventors: Alexander Bergmiller, Koenigsbrunn (DE); Rainer Mathias, Tutzing (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 10/868,765

(22) Filed: Jun. 17, 2004

(65) Prior Publication Data
US 2004/0256892 A1    Dec. 23, 2004

(30) Foreign Application Priority Data
Jun. 18, 2003 (DE) .............................. 103 27 540

(51) Int. Cl.[7] .............................................. B60J 7/047
(52) U.S. Cl. ......................... 296/220.01; 296/216.06; 296/216.08
(58) Field of Search ....................... 296/220.01, 216.06, 296/216.08

(56) References Cited

U.S. PATENT DOCUMENTS 6,158,803 A     12/2000   Reihl et al.
6,443,520 B1 *  9/2002    Schmaelzle et al. ... 296/216.08
6,527,337 B2 *  3/2003    Farber ........................ 296/222
6,805,402 B2 * 10/2004    Pfalzgraf ............... 296/220.01

FOREIGN PATENT DOCUMENTS

DE       197 13 347 C1    5/1999
DE       101 39 349 C1    4/2003

* cited by examiner

Primary Examiner—Dennis H. Pedder
(74) Attorney, Agent, or Firm—Nixon Peabody LLP; David S. Safran

(57) ABSTRACT

A motor vehicle roof with two covers which are arranged in succession and roughly at the height of the roof contour in the closed position. At least part of the front cover is displaced to the rear above the rear cover into the open position for clearing a front roof opening section, and in this open position, the front cover is supported by laterally arranged support levers, each of which are coupled to the rear area of the front cover and are guided in the lengthwise direction of the vehicle in a guide rail located below the roof contour. The guide rail extends laterally outward of the side edge of the roof opening and in the open position the rear cover is lowered below the roof contour and the support lever extends through a gap which is formed as a result of lowering of the rear cover.

11 Claims, 4 Drawing Sheets

OPENABLE MOTOR VEHICLE ROOF

BACKGROUND OF THE INVENTION

1. Field of the Invention

This invention relates to a motor vehicle roof with two covers which, in the closed position, close a roof opening and are arranged in succession viewed in the lengthwise direction of the vehicle and roughly at the height of the roof contour, the front cover being displaced to the rear, so that at least part of its lengthwise extension is located above the rear cover, into the open position for clearing a front roof opening section and in this open position, being supported by means of laterally arranged support levers which are each coupled, on the one hand to the rear cover area, and on the other hand, are guided in the lengthwise direction of the vehicle in a guide rail located underneath the roof contour.

2. Description of Related Art

A roof of the initially mentioned type is known, for example, from German Patent DE 197 13 347 C1 and corresponding U.S. Pat. No. 6,158,803. In this known motor vehicle roof, there is a front cover which can be raised at its rear edge by means of a raising lever for opening and then can be moved above the fixed motor vehicle roof, specifically over a fixed roof window which is located in the rear roof area, the movable cover, at its rear edge area, being supported by means of laterally arranged support levers which are each coupled at one end to the rear edge area of the cover and at the other end are guided in a guide rail which is located underneath the roof contour, on either side of the fixed roof window there being a respective seal arrangement which is formed from two seals which are separated from one another when the front cover is raised and displaced by the support levers which emerge upward.

Even if in this known motor vehicle roof, provides stable support of the cover in the opened state in which it has been displaced to the rear, passage of the support lever through the seal arrangement or partial displacement of the seals by the moving support levers is associated with a host of disadvantages.

First of all, the seal arrangement formed from the two seals which adjoin one another for sealing the gap between the fixed roof window and the adjacent fixed areas of the motor vehicle roof is comparatively complex. Costs must be borne for two separate parts and their installation. Furthermore, the visual appearance of the vehicle is adversely affected by the execution of the seal arrangement from two seals which are located next to one another. Additionally, for reliable sealing in the closed state and at the same time reliable operation of the cover opening process, comparatively precise matching of the gap dimension between the two adjoining seals is necessary. Finally, even with careful matching of this critical gap size, more or less considerable mechanical wear of the two seals by the support lever which travels on it with friction and gradual, irreversible deformation of the two seals are inevitable, so that over the course of time leaks in the motor vehicle roof can occur.

German Patent DE 101 39 349 C1 describes a seal arrangement for a guide gap for lengthwise guidance of a support lever arrangement which passes through the guide gap, the particular feature of which resides in that, in order to prevent the aforementioned problems, at least one of the two seals is formed by an essentially rigid seal strip which is pre-tensioned by spring means relative to the other seal, which is sealed against the assigned edge of the guide gap, and which is movably supported overall transversely to the lengthwise direction of the guide gap. This known seal arrangement, compared to conventional seal arrangements with two elastic seal profiles, offers mainly the advantage that the opening of the seal gap for passage of the support lever arrangement no longer takes place by deformation of the seal profiles, but by the seal strip being displaced laterally. However, the disadvantage of this seal arrangement is the construction cost for implementation of the pre-tensioning of the spring and the displacement of the seal strip sideways.

SUMMARY OF THE INVENTION

A primary object of the present invention is to devise a motor vehicle roof of the initially mentioned type in which the ability of the front cover to be moved to the rear without major wear can be accomplished in a structurally simple and aesthetically pleasing manner.

This object is achieved with a motor vehicle roof of the initially mentioned type by the guide rail extending laterally outside of the side edge of the roof opening, and in the illustrated open position, the rear cover being lowered to below the roof contour and by the support lever extending through the gap which has been formed as a result of lowering of the rear cover.

In accordance with the invention, it is provided that the guide rail extends laterally outside of the side edge of the roof opening, and in the indicated open position, the rear cover is lowered to under the roof contour and the support lever extends through a gap which has been formed as a result of the lowering of the rear cover.

In the motor vehicle roof of the invention, the transition area between the rear cover and the adjacent vehicle roof areas can be sealed in a structurally simple and aesthetically pleasing manner, since the properties of the seal arrangement which is to be provided at this location need not be designed with consideration of a support lever arrangement which emerges to the top at this location. Rather, by lowering the rear cover, enough space (a gap) can be formed to support the front cover which has been displaced to the rear or which is being displaced to the rear by means of a support lever arrangement which projects out of the roof contour to the top.

If the support lever arrangement touches a side edge area of the rear cover and/or a side edge area of the roof opening or seals which are located in these areas when the front cover is being displaced, the resulting frictional load can be made comparatively small. Thus, no noteworthy wear results in these areas.

In one preferred embodiment, it is provided that the support lever arrangement is guided at a distance from the side edge of the roof opening and/or relative to the side edge of the rear cover. In particular, when the support lever arrangement moves from two of the indicated edges at a distance, the wear caused by friction or deformation can be completely avoided.

With respect to the specific configuration of the support lever and its support on the cover and on the guide rail, basically for example, the technology known from the initially mentioned German Patent DE 197 13 347 C1 can be used. What must be watched here is simply that the support lever, as a result of its guide which is located laterally outside the edge of the roof opening, must run more or less curved or kinked in order to extend from the guide rail to the cover.

Preferably, the support levers extend from their guide first essentially horizontally relative to the lengthwise center line of the vehicle and immediately before reaching the cover, essentially vertically up to a coupling point on the bottom of the cover.

The coupling point on the cover viewed in the transverse direction is preferably directly adjacent to the lateral cover edge. Viewed in the lengthwise direction, the coupling point on the cover is located preferably in the rear third, preferably in the last quarter of the lengthwise extension of the cover.

Preferably, the guide rail is part of the frame which surrounds the roof opening at the underside of the roof and which holds or forms the components which are essential to operation of the roof opening system in the conventional manner. The guide rail, at least in the rearmost part of its course, should be located relatively far to the top, therefore roughly directly under the lateral fixed roof section in order to enable penetration of the gap which has been cleared by lowering the rear cover even for a small lowering stroke.

Generally, it is advantageous if the course of the guide rail runs from front to back, viewed in the lengthwise direction of the vehicle, "stepped upward", therefore for example, it first runs essentially horizontally, then runs curved to the top in an arc shape and finally again in an arc shape discharges into an essentially horizontal segment of the course. The front cover can be lifted and/or raised as it is displaced by such a course.

The lowering of the rear cover can have a translational and/or a rotational portion. The two extreme cases will now be described in greater detail.

If the rear cover is lowered simply translationally, the support levers, viewed in the lengthwise direction of the vehicle, can be moved in principle somewhat to the rear edge of the roof opening. Accordingly, depending on the location of the support lever coupling relative to the cover, the front cover which has been entrained here by the support levers with its rear edge, viewed in the lengthwise direction of the vehicle, can then likewise reach at least the rear edge of the roof opening.

If the rear cover is lowered simply by pivoting around an axis which is located near its rear edge, therefore so that essentially the front part of the cover is lowered, the support levers, viewed in the lengthwise direction of the vehicle, cannot be moved as far as the rear edge of the roof opening (in order not to collide with the rear cover). Accordingly, but also depending on the location of the support lever coupling relative to the front cover, the front cover which has been entrained by the support levers, viewed in the lengthwise direction of the vehicle, can then be moved somewhat less far to the rear.

However, in both of the aforementioned cases, if the front cover (at least on its rear edge) before or during its displacement to the rear is raised (for example, by a guide rail which is upwardly curved), the rear part of the front cover can also be displaced to the rear over the fixed roof skin so that its rear edge is located on the other side of the rear edge of the roof opening.

In one embodiment, it is provided that, in the indicated open position, the rear edge of the front cover is raised over the roof contour. This is, for example, favorable with respect to the installation space conditions in the area of the support lever arrangement.

Thus, in this case, the guide of the support lever arrangement can be located in a space-saving manner directly under the fixed roof skin. At the same time, in this case, a comparatively small amount of lowering of the rear cover can be enough to create enough space for passage of the support levers which extend roughly horizontally away from the guide rail.

Furthermore, in this case, the rear area of the rear cover can be displaced to the rear to achieve a large amount of clearance of the roof opening, advantageously beyond the rear edge of the roof opening.

Finally, the rear edge of the front cover, which edge has been raised above, the roof contour, allows greater freedom with respect to clearance of the roof opening with a simultaneously especially advantageous seal between this cover edge and the roof area which is located behind, as will be explained below.

According to one development of the invention, it is provided that, in the indicated open position, the front cover is displaced to the rear such that the seal surface, which is located below the rear edge of the front cover, rests against the rear edge of the roof opening.

By providing this open position the front cover can be displaced comparatively far to the rear; this in turn can be used for a large amount of roof opening clearance in the front area of the roof opening. In the indicated open position as a result of the contact between the seal surface and the edge of the roof opening the occurrence of excess air passage in the vehicle interior while driving is advantageously avoided. It should be noted that especially high demands are not imposed on the tightness of this sealing surface contact in order to prevent this air passage. In this respect it is satisfactory in practice if a considerable portion, especially most of the transition gap between the front cover and the rear edge of the roof opening, is closed by the sealing surface contact.

In one preferred embodiment, the sealing surface is provided by an elastic sealing element. This sealing element provides the sealing surface preferably running continuously in the transverse direction of the vehicle and can be made, for example, in terms of its shape and material, such as is conventional for the seals of the edge gap. The sealing surface is located between the edge of a movable cover of the roof opening system and the edge section of the respective portion of the roof opening when the vehicle roof is closed (on the cover and/or on the edge of the roof opening), therefore for example, a profile seal which has been produced from an elastomer.

In one development, it is provided that this sealing element is supported on a cover reinforcement which is located on the bottom of the front cover, for example, is held or molded on such a cover reinforcement. A sealing element which is made as a profile seal can be held, for example, positively on the cover reinforcement. In one alternative embodiment, the sealing surface is provided directly by a section of such a cover reinforcement, which section faces downward. The then lack of resilience of the sealing surface is, in practice, not a problem mainly when the rear edge of the roof opening is provided with an elastic sealing element. Conventionally, to ensure a good seal, in the closed position, there is generally a seal which runs peripherally over the entire edge of the roof opening anyway. The expression "cover reinforcement" encompasses especially a cover reinforcing sheet or a cover reinforcing sheet structure as is provided conventionally for mechanical stiffening of the cover of a roof opening system on the edge of the cover, for example, is closed peripherally in the shape of a frame on the bottom of the cover.

In one development, it is provided that the sealing element furthermore has a sealing surface which is located on the rear edge of the front cover and which rests against the rear edge of the roof opening in the closed position. Advantageously, the sealing element then has a double function, specifically sealing toward the rear edge of the roof opening, on the one hand, in the closed position, and on the other, in the indicated open position.

In one preferred embodiment, it is provided that the rear edge of the roof opening is curved and the sealing surface is matched to this curved course, for example, in order to rest against the rear edge of the roof opening in the indicated open position over the entire transverse extension of the roof opening. Thus, a seal is achieved which is especially good since it extends into the side edge areas of the rear edge of the roof opening. Here, first of all, a curvature of the roof opening in its corner areas, which curvature is apparent in an overhead view of the vehicle roof, is intended ("corner radii"). These rounded corners of the edge of the roof opening are necessary for reasons of production engineering in roof cutouts or are at least advantageous. There can be matching of the course of the sealing surface, alternatively or additionally, also with respect to the so-called transverse arch. This transverse arch is apparent, for example, in a cross sectional view of the vehicle roof.

In addition, sealing can also be easily provided laterally by there being other sealing surfaces which rest against the side edges of the roof opening in the indicated open position on the bottoms of the two side edges of the roof opening. The structure is especially simple when the sealing surface on the rear edge of the cover continues on either side into the other sealing surfaces on the lateral cover edges. This can be achieved, for example, with a sealing element which provides this sealing surface arrangement, which sealing element runs roughly in a U-shape viewed from above (or closed in a ring-shape on the edge of the cover). Again, individual sealing surface sections or the entire sealing surface arrangement can be implemented directly by the surface of a cover reinforcing sheet which is intended to make contact with the edge of the roof opening. In the lateral areas, the other sealing surfaces which are provided by the cover reinforcing sheet, directly or by the sealing element which is molded or held on the cover reinforcing sheet, can be used as vision screens in order to make it impossible to look into the lateral gap between the cover and the roof contour in the indicated open position. Any of these other sealing surfaces can be advantageously provided on the sealing element which also has a sealing surface which, in the closed position, lies against the assigned side edge of the roof opening. In one preferred embodiment, all of the aforementioned sealing surfaces and other sealing surfaces are provided for sealing both in the closed position and also the indicated open position by a sealing element which is located on the edge of the front cover and which is made in one piece.

In one embodiment, it is provided that the two covers have at least roughly the same lengthwise extension. This encompasses the case in which the lengthwise extension of the front cover is in the range of 40% to 60% of the lengthwise extension of the rear cover. With this dimensioning of the two covers, in the indicated open position, a comparatively large amount of roof opening clearance can be achieved for the front roof opening area when, in this open position, there is only lowering of the rear cover and no rearward displacement of the rear cover to under the roof section behind the roof opening.

Quite generally, to achieve a large amount of roof opening clearance in the indicated open position, it is advantageous if, in this open position, the front edges of the two covers, viewed in the lengthwise direction of the motor vehicle, are located roughly in the same position.

In one preferred embodiment, it is provided that the front edge of the front cover is located roughly at the height of the roof contour in the indicated open position. This simplifies, on the one hand, the construction of a guide of the front cover, for example, by guide rails which are arranged laterally in the conventional manner under the roof contour, and is moreover, advantageous with respect to aerodynamics. Thus, for example, the air flowing over the roof opening while driving is captured by the front edge of the front cover and deflected upward so that this cover acts like a spoiler and very effectively reduces the delivery of this air flow into the vehicle interior; this leads to lower dynamic pressure formation and noise development.

Within the scope of the invention, it is not precluded that, in addition to the indicated two covers, there are other covers, for example, a third cover which is located farther forward and which directly adjoins the front cover.

One embodiment of the invention is described in greater detail below with reference to the accompanying drawings.

DETAILED DESCRIPTION OF THE INVENTION

Figure 1:
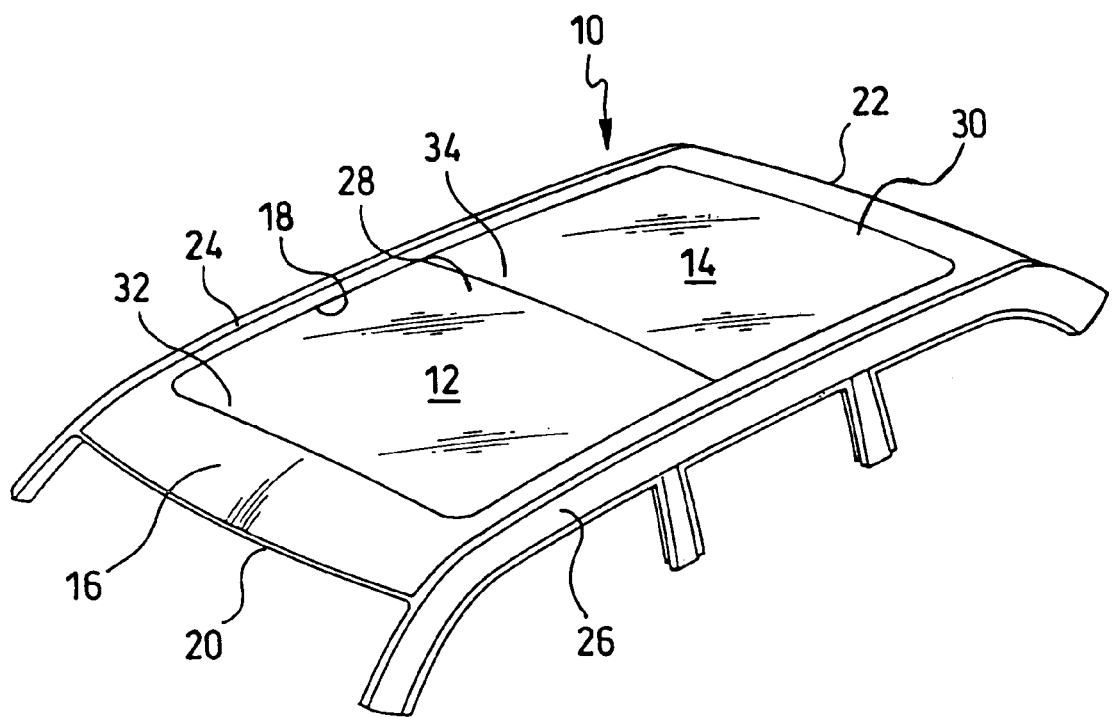
FIG. 1 is a perspective view of the vehicle roof.

FIG. 1 shows a vehicle roof 10 with two covers 12, 14 which are located in succession and roughly at the height of the roof contour in the illustrated situation (closed position), viewed in the lengthwise direction of the vehicle, and which close the roof opening 18 which is formed in the fixed roof skin 16. The designations "front cover 12" and "rear cover 14" are used below to relate to their arrangement in the closed position.

The vehicle roof 10 is a so-called panoramic roof in which both the front cover 12 and also the rear cover 14 are made transparent and the roof opening 18 is roughly rectangular and takes up most of the roof surface. The roof opening 18 extends in the lengthwise direction of the vehicle from near the front edge 20 of the roof skin to near the rear edge 22 of the roof skin, and in the transverse direction of the vehicle, just to the side members 24, 26 which run in the lengthwise direction.

On the bottom of the fixed roof section 16, a frame (not shown) is attached which has guide rails on either side of the roof opening 18 by means of which the front cover 12 and the rear cover 15 are movably supported in the lengthwise direction of the vehicle. Furthermore, the two covers 12, 14 are provided with a pivot mechanism (not shown) by which the respective rear cover edge 28, 30 of the covers 12, 14 can be raised with respect to the front edge 32, 34 of the cover, respectively, for implementing a so-called ventilator position.

In the embodiment shown, the pivot mechanism, proceeding from the illustrated closed position, allows lifting of the cover edge 28 with simultaneous lowering of the cover edge 34 to form a ventilation gap between the covers 12, 14. In this special ventilation position, the advantage of a comparatively large ventilation gap arises with a small raising or lowering stroke of the covers 12, 14. Preferably, ventilation positions are also possible in which one or both of the rear cover edges 28, 30 are raised or only the front cover 34 is lowered. In one advantageous embodiment, it is provided that a rear cover 14, which has been lowered at its front edge 34 for ventilation, is automatically moved to its normal position (flush with the roof contour) when rain is detected by a rain sensor of the vehicle. Proceeding from the aforementioned ventilation position, a (reduced) ventilation gap remains between the two covers after this return of the rear cover (14).

For their pivoting movements and sliding movements along the guide rails, the covers 12, 14 are each driven by its own drive which can be made in the conventional manner, for example, as an electric motor with a pinion and compressively stiff drive cables. A displacement mechanism (not shown) lowers one of the covers 12, 14 as is moves lengthwise to under the other cover 14, 12. Moreover, for the vehicle roof 10, various open positions can be reached in which the roof opening 18 is partially cleared, specifically to the front or back or to the front and back.

The mechanisms by which the covers are moved form no part of the present invention by themselves and can be of any known type. Particularly suitable for adaptation to use in the present invention is the type of pivot and displacement mechanism shown in German Patent DE 197 13 347 C1 and corresponding U.S. Pat. No. 6,158,803.

FIG. 2 again shows the vehicle roof 10 when the covers 12, 14 are in the closed position. In the conventional manner, cover seals are peripherally attached to the cover edges and seal the gaps between the covers (between the cover edges 28, 34) and the gaps between each cover and the fixed roof skin 16. Furthermore, the roof opening seal is arranged peripherally on the edge of the roof opening 18 and interacts with the cover seals.

Figure 2:
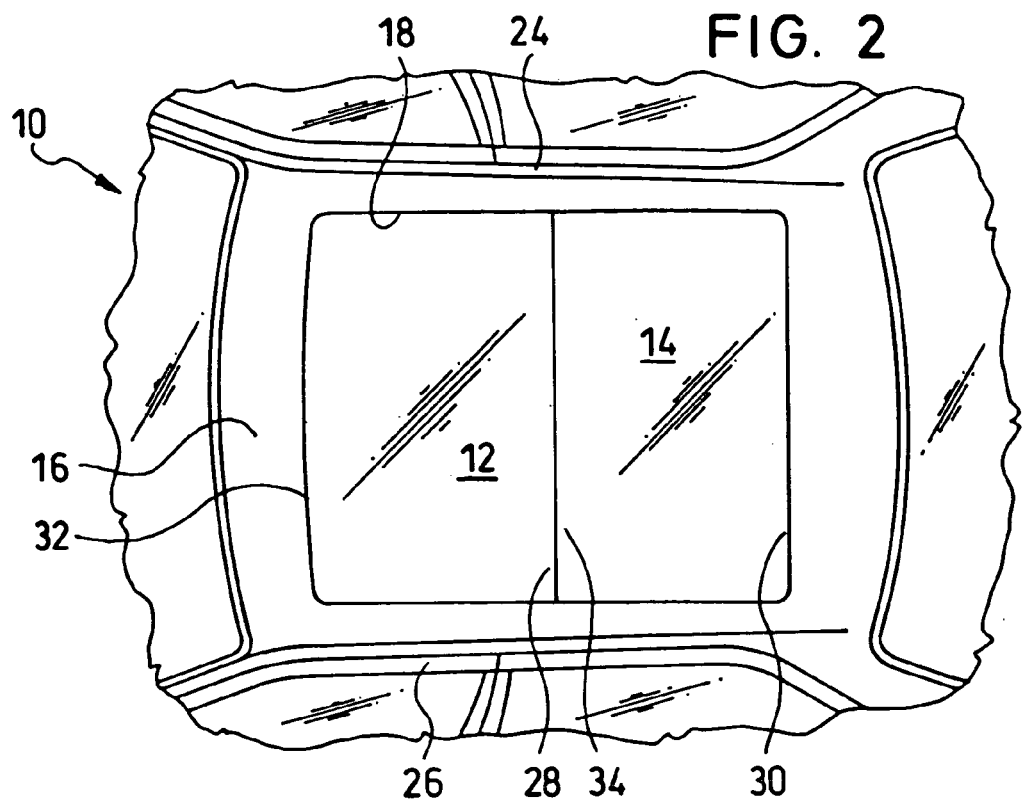
FIG. 2 is an overhead view of the vehicle roof from FIG. 1 in the closed state.
Figure 3:
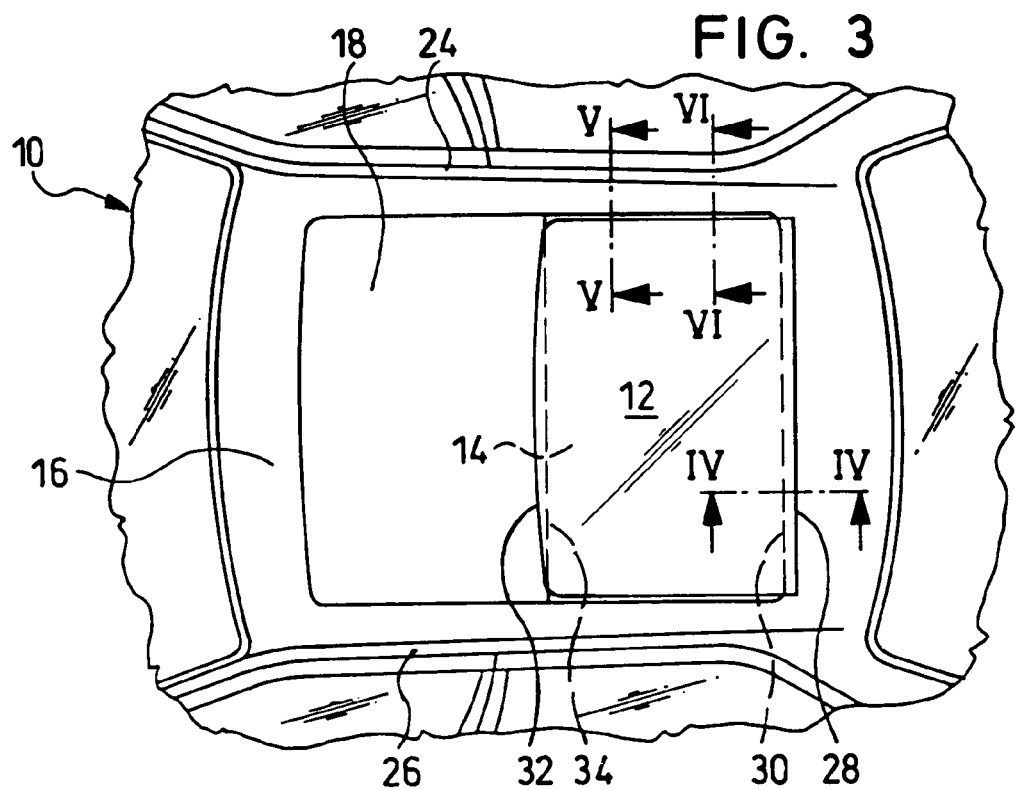
FIG. 3 is an overhead view of the vehicle roof from FIG. 1 in the opened state.

FIG. 3 illustrates, in a view corresponding to FIG. 2, an open position in which the rear cover 14 is lowered and the front cover 12 is displaced to the rear over the cover 14 such that the sealing surface 40 (FIG. 4) which is located on the bottom of the rear edge 28 of the front cover 12 rests against the rear edge of the roof opening 18 (provided here with a peripheral roof opening seal 48). This sealing in the rear area of the roof opening 18, under certain circumstances, reduces the resulting disturbing noise. It is noted that the sealing contact provided in the open position can also be easily accomplished when the roof contour, in the area of the transition between the two covers, has a transverse arch which deviates significantly from the transverse arch of the roof contour on the rear edge of the roof opening.

Figure 4:
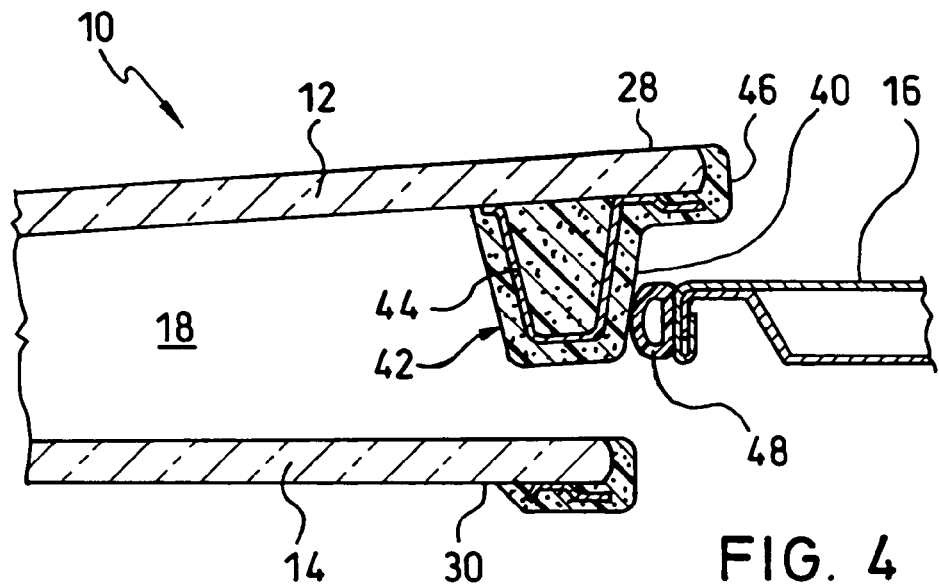
FIG. 4 is a sectional view taken along line IV—IV in FIG. 3.

As is apparent in FIG. 4, in this open position, the rear cover 14 is lowered only translationally (is not pivoted), conversely, the front cover 12, proceeding from the closed position (FIG. 2), has been raised at its rear edge 28 by means of the pivot mechanism, and then, has been pushed to the rear into the position shown in FIG. 4 by means of the displacement mechanism.

The sealing surface 40 is formed by a section of the peripheral cover seal 42 (made, for example, of PU foam) which is used as the elastic sealing element, which is molded to the cover reinforcing sheet 44, and moreover, is supported on it; the aforementioned section projects on the bottom of the cover 12. The cover seal 42 has a sealing surface 46 which is located somewhat farther upward on the rear cover edge and which, in the closed position (FIG. 2), seals the rear edge 28 of the cover 12 against the front edge 34 of the rear cover. This front edge 34 can also be provided with an elastic edge gap seal.

In order to achieve a seal relative to the rear edge of the roof opening in the open position over the entire transverse extension of the roof opening, the sealing surface 40 is matched to the curved course of the rear edge of the roof opening so that this sealing surface 40 adjoins over the entire transverse extension of this edge of the roof opening (compare broken line in FIG. 3). This sealing prevents disturbing air passage through the vehicle interior which is otherwise possible as a result of the roof opening 18 which has been cleared to the front.

The cover seal 42 which is provided peripherally on the edge of the front cover 12 has sealing surfaces 50 on the two side edges of the cover 12 which, in the illustrated open position, rest against the side edges of the roof opening or against the roof opening seal which is attached there.

Figure 5:
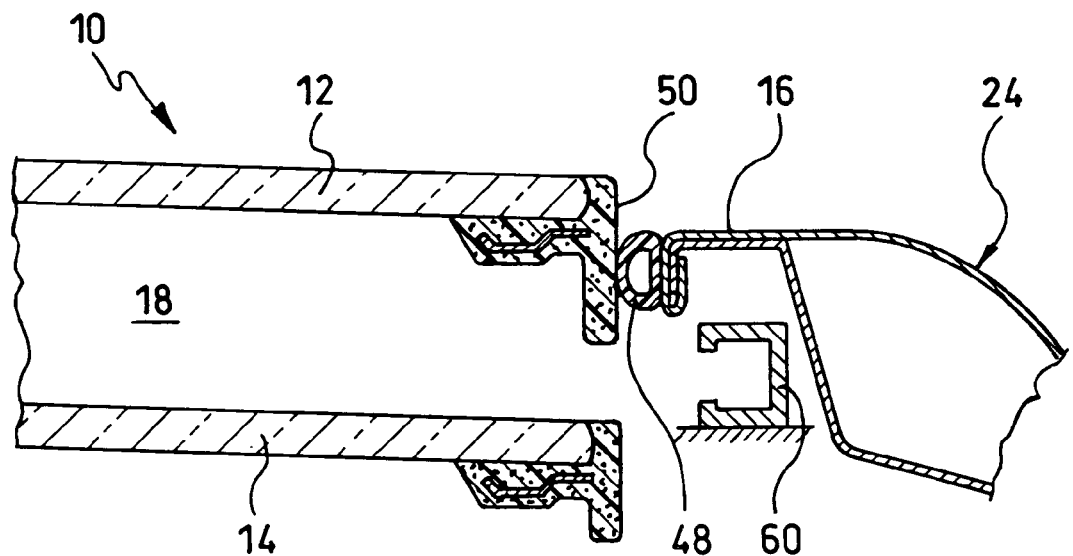
FIG. 5 is a sectional view taken along line V—V in FIG. 3.

FIG. 5 shows one of these other sealing surfaces 50. In addition to the advantageous action to prevent air passage, these seal sections, which project laterally on the underside of the cover 12, are also used as a visual lining which improves the aesthetic appearance offered in the open position. Furthermore, this figure shows a guide rail 60 which forms part of the pivot and displacement mechanism which is assigned to the cover 12.

Thus, overall, a contact surface for making contact against the roof opening seal which is attached on the body side is formed laterally and to the rear on the cover 12. The lateral cover seal sections or cover screens run with the corner radius of the rear edge of the roof opening into the cover reinforcement which is located on the rear edge 28 of the cover 12 on the bottom.

In the illustrated open position, the front edge 32 of the front cover 12 is located at the height of the roof contour so that this cover edge can be movably supported in the conventional and structurally simple manner by guide rails which are housed in the lateral area (near the side members 24, 26). In addition, this type of raising of the cover 12 results in that air which flows over the opened section of the motor vehicle roof 10 is deflected up in an aerodynamically favorable manner and is not dammed up in the vehicle interior.

The two covers 12, 14 have a lengthwise extension of roughly the same size so that, in the open position shown in FIG. 3, the roof opening clearance is relatively large. In this embodiment, in the open position, the front cover edges viewed in the lengthwise direction of the vehicle are at the same height. Since in this situation, the rear cover 14 is simply lowered, but not pushed to the rear, this requires a slightly greater lengthwise extension of the front cover 12 relative to the lengthwise extension of the rear cover 14. This is in view of the distance given in the lengthwise direction of the vehicle between the sealing surface 40 and the rear edge or the rear sealing surface 46 of the cover 12. In contrast to the illustrated embodiment, it is conceivable that, in the indicated open position, the rear cover 14 can be lowered not only out of the plane of the roof contour, but can be pushed subsequently to the rear, for example, to enable even greater roof opening clearance in the front roof opening area. Then, feasibly, the front cover 12 can be made smaller than the rear cover 14 and/or the distance provided in the lengthwise direction of the vehicle between the rear edge of the cover 12 and the sealing surface 40 is provided to be larger than in the illustrated example. In the latter case, the cover 12 would then be pushed farther to the rear over the fixed roof skin 16.

Figure 6:
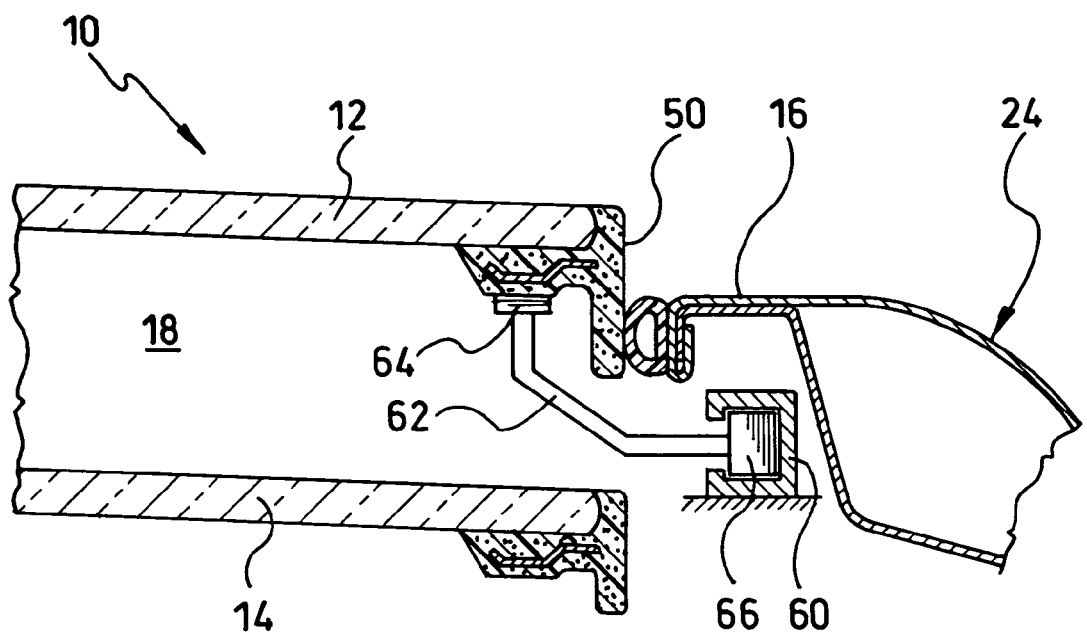
FIG. 6 is a sectional view taken along line VI—VI in FIG. 3.

FIG. 6 shows a cross section taken along line VI—VI in FIG. 3, in the rear lateral transition area between the cover arrangement 12, 14 and the fixed roof skin 16 near the right side member 24. The front cover 12, which has been displaced to the rear over the rear cover 14 to clear the front section of the roof opening over part of its lengthwise extension, is supported on each side of its rear edge area by means of a respective laterally arranged support lever 62 which is coupled, on the one hand, to the rear edge area of the cover at 64, and on the other hand, is guided on a slide piece 66 in the guide rail 60 which is located underneath the roof contour. The guide rail 60 is located laterally outward of the side edge of the roof opening 18 and extends in the lengthwise direction of the vehicle. The support lever 62 extends in the illustrated open position through the gap which has been formed after the rear cover 14 has been lowered.

The support lever 62 and its arrangement are such that, in the transition from the closed position into the illustrated open position, the support lever 62 does not touch either the rear cover 14 or the edge of the roof opening 18. This guidance of the support lever 62 at this distance avoids any mechanical wear, as is caused in motor vehicle roofs which are made in the conventional manner when a support lever moves between the two compressed seals.

Preferably, the support levers 62 extend from their guide rail 60 first essentially horizontally relative to the lengthwise center line of the vehicle and immediately before reaching the cover, essentially vertically up to the coupling point 64 on the bottom of the front cover 12.

The coupling point 64 on the front cover 12, viewed in the transverse direction, is preferably directly adjacent to the lateral cover edge. Viewed in the lengthwise direction, the coupling point 64 on the front cover 12 is located preferably in the rear third, preferably in the last quarter of the lengthwise extension of the front cover 12.

Preferably, the guide rail 60 is part of the frame which surrounds the roof opening at the underside of the roof and which holds or forms the components which are essential to operation of the roof opening system in the conventional manner. The guide rail 60, at least in the rearmost part of its course, should be located relatively far upward, therefore roughly directly under the lateral fixed roof section in order to enable penetration of the gap which has been cleared by lowering the rear cover 14 even for a small lowering stroke.

Generally, it is advantageous if the course of the guide rail 60 runs from front to back, viewed in the lengthwise direction of the vehicle, "stepped upward," so that, for example, it first runs essentially horizontally, then runs curved upward in an S-shaped arcuate section that discharges into a higher, essentially horizontal segment of the course. The front cover can be lifted and/or raised as it is displaced along the guide.

It is conceivable for the support lever 62 to be supported in the guide rail 60 in order to be able to pivot around the axis which has been formed by the slide piece 66 and for it to be first pivot proceeding from the closed position in the transition into the indicated open position for raising the rear edge 28 of the front cover 12. In this design, the support lever 62 is used moreover as a raising lever for lifting the cover edge 28. However, to achieve a supportting of the cover 12 which is as stiff as possible in the state displaced to the rear, it is preferred that the support lever 62 be supported in a manner that is fixed against rotation in the guide rail 60.

What is claimed is:

1. Motor vehicle roof, comprising:

a fixed roof surface having a roof opening formed therein, at least a front cover and a rear cover, the covers being arranged in succession viewed in the lengthwise direction of the vehicle and being roughly at the height of the roof contour in a closed position thereof in which they close the roof opening, and a guide rail located underneath the fixed roof surface laterally outside of each side edge of the roof opening, wherein the front cover is displaceable to the rear into an open position in which at least part of its lengthwise extension extends over the rear cover for clearing a front section of the roof opening, wherein laterally arranged support levers are each guided in the lengthwise direction of the vehicle in a respective said guide rail and support a respective side of the front cover in said open position, wherein the rear cover is lowered below the fixed roof surface is said open position and each support lever extends laterally through a gap formed between the lowered rear cover and the fixed roof surface.

2. Motor vehicle roof as claimed in claim 1, wherein each support lever is guided at a distance from a side edge of the roof opening and a side edge of the rear cover.

3. Motor vehicle roof as claimed in claim 1, wherein, in the open position, the rear edge of the front cover is located above the fixed roof surface.

4. Motor vehicle roof as claimed in claim 1, wherein the front cover has a sealing surface located on a bottom a rear edge area thereof, and in the open position, said sealing surface rests against a rear edge of the roof opening.

5. Motor vehicle roof as claimed in claim 4, wherein the sealing surface is formed on an elastic sealing element which is supported on a cover reinforcement which is located on an underside of the front cover part.

6. Motor vehicle roof as claimed in claim 5, wherein the sealing element has a second sealing surface which is located on a rear end of the front cover and which rests against a front edge of the rear cover in the closed position.

7. Motor vehicle roof as claimed in claim 4, wherein the roof opening has a curved rear edge and wherein the sealing surface has a curvature that is matched to the curvature of the rear edge of the roof opening.

8. Motor vehicle roof as claimed in claim 1, wherein the front edge of the front cover is located roughly at the height of the roof fixed roof surface in the open position.

9. Motor vehicle roof as claimed in claim 1, wherein the covers have at least roughly the same length.

10. Motor vehicle roof as claimed in claim 1, wherein the covers are movable from the closed position into a ventilation position in which a rear edge of the front cover is raised and a front edge of the rear cover is lowered.

11. Motor vehicle roof as claimed in claim 10, wherein at least one of the at least two covers is displaceable from the ventilation position in the lengthwise direction of the motor vehicle into a position which at least partially overlaps another of the at least two covers.

* * * * *